United States Patent
Huang et al.

(10) Patent No.: US 6,594,243 B1
(45) Date of Patent: Jul. 15, 2003

(54) METHODS AND APPARATUS FOR ENHANCED SOFT HANDOFF IN A CDMA WIRELESS COMMUNICATION SYSTEM

(75) Inventors: Ching Yao Huang, Randolph, NJ (US); Joe Huang, Parsippany, NJ (US); I-Fong Antonio Wu, Randolph, NJ (US); Xiao Cheng Wu, Parsippany, NJ (US); Bee Yun Yu, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/354,220

(22) Filed: Jul. 15, 1999

(51) Int. Cl.$^7$ .............................. H04Q 7/00; H04Q 7/20
(52) U.S. Cl. ........................................ 370/332; 455/442
(58) Field of Search ........................ 455/442, 436–441, 455/443, 444; 370/331–337

(56) References Cited

U.S. PATENT DOCUMENTS

| | | | |
|---|---|---|---|
| 5,267,261 A | | 11/1993 | Blakeney, II et al. |
| 5,898,682 A | | 4/1999 | Kanai |
| 6,151,502 A | * | 11/2000 | Padovani et al. ............ 370/331 |
| 6,233,455 B1 | * | 5/2001 | Ramakrishna et al. ...... 455/437 |
| 6,337,984 B1 | * | 1/2002 | Hong et al. .................. 370/332 |
| 6,353,602 B1 | * | 3/2002 | Cheng et al. ................ 370/332 |
| 6,381,458 B1 | * | 4/2002 | Frodigh et al. .............. 455/442 |

FOREIGN PATENT DOCUMENTS

WO  WO 99/04593  1/1999

OTHER PUBLICATIONS

ANSI/TIA/EIA–95–B, "Mobile Station—Base Station Compatibility Standard for Dual–Mode Spread Spectrum Systems," pp. 6–347 to 6–417, pp. 7–168 to 7–175 and pp. 7–206 to 7–212, Oct. 31, 1998.

* cited by examiner

Primary Examiner—Tracy Legree

(57) ABSTRACT

Soft handoffs in an IS-95 CDMA system or other wireless communication system are controlled using an enhanced set of soft handoff parameters which allow the system to adapt more readily to changing radio frequency (RF) conditions. In an illustrative embodiment, values for particular ones of the soft handoff parameters are selected in accordance with a set of rules, including rules such as, e.g., select the minimum value of add threshold among the members of an active set of pilots for a given mobile station; select the maximum value of drop threshold among the members of the active set; select the minimum value of drop threshold timer among the members of the active set; and select the minimum value of comparison threshold among the members of the active set. A quality measure is then determined for each of the members of the active set, based on one or more of the selected soft handoff parameter values and values of one or more additional parameters, e.g., add intercept, drop intercept and slope parameters, associated with those members. Particular values of the additional parameters are then selected based on the quality measures. The selected parameter values are then utilized in a soft handoff process, e.g., in a soft handoff process in which the given mobile station is directed to handoff from a primary base station to another base station of the system.

22 Claims, 4 Drawing Sheets

US 6,594,243 B1

METHODS AND APPARATUS FOR ENHANCED SOFT HANDOFF IN A CDMA WIRELESS COMMUNICATION SYSTEM

FIELD OF THE INVENTION

The present invention relates generally to wireless communication systems and more particularly to techniques for performing soft handoffs in wireless code division multiple access (CDMA) systems and other types of wireless systems.

BACKGROUND OF THE INVENTION

An important issue in IS-95 CDMA cellular and Personal Communications Service (PCS) wireless communication systems involves handoffs of on-going calls or other communications between adjacent cells or antenna sectors. Each of the cells in such a system generally includes a base station, and the base station associated with a given cell may include an omnidirectional antenna or a multiple-sector directional antenna for communicating with mobile stations such as portable telephone handsets or portable computers. As a mobile station moves throughout the system, its position relative to the system base stations changes, such that an on-going call or other communication may need to be handed off from one base station to another, or from one antenna sector to another within a given base station.

Adjacent base stations and antenna sectors are typically configured to utilize different communication frequencies in order to minimize effects such as co-channel interference. Handoffs from one cell or sector to another may therefore involve changing the communication channel frequency from a current frequency to a new frequency. Such handoffs are generally referred to as hard handoffs, inter-frequency handoffs or other-frequency handoffs. Handoffs which do not involve a change in communication frequency are generally referred to as soft handoffs. For example, in a typical soft handoff in an IS-95 CDMA system, a mobile station communicating with a given base station commences communications with a new base station without interrupting communications with the given base station. This type of soft handoff is designed to provide diversity of forward, i.e., base-to-mobile, traffic channel and reverse, i.e., mobile-to-base, traffic channel paths at the boundaries between base stations.

A significant problem with the current soft handoff algorithm utilized in IS-95 CDMA systems is that it performs poorly in a dynamically changing radio frequency (RF) environment. As a result, the call drop rate in such an environment is often excessive.

A need therefore exists for improved soft handoff techniques for use in CDMA systems and other types of wireless cellular systems, such that the call drop rate in dynamically changing RF environments is significantly reduced.

SUMMARY OF THE INVENTION

The invention provides methods and apparatus for improving soft handoffs in CDMA systems and other types of wireless communication systems, through the use of an enhanced set of soft handoff parameters which allow the system to adapt more readily to changing RF conditions. In an illustrative embodiment, values for particular ones of the soft handoff parameters are selected in accordance with a set of rules. An exemplary set of selection rules includes the following: (1) select the minimum value of add threshold among the members of an active set of pilots; (2) select the maximum value of drop threshold among the members of the active set; (3) select the minimum value of drop threshold timer among the members of the active set; (4) if the selected add threshold value is below the selected drop threshold value, select the add and drop threshold values associated with the member of the active set having the lowest add threshold value; and (5) if the selected add threshold value is equal to the selected drop threshold value, select the equal add and drop threshold values.

A quality measure is then determined for each of at least a subset of the members of the active set, based on one or more of the selected soft handoff parameter values and values of one or more additional parameters, e.g., add intercept, drop intercept and slope parameters, associated with those members. Particular values of the additional parameters are then selected based on the quality measures. The selected parameter values may then be utilized by the corresponding mobile station, e.g., in an otherwise conventional soft handoff process in which the mobile station is directed to handoff an on-going communication from a current primary base station to another base station of the system.

In accordance with the invention, the above-noted quality measures may be determined by first determining a quality measure for each of the N members of the active set, where N is typically less than or equal to six. The quality measure is determined for a given one of the N members of the active set using the minimum add threshold value among the values associated with the members of the active set, and add intercept and soft slope parameter values associated with the given member of the active set. After the quality measures are determined in this manner for each of the members of the active set, the additional parameter values may then be selected as the additional parameter values associated with the particular active set member having the maximum quality measure among all the members of the active set.

Advantageously, the invention can be used to optimize the performance of an otherwise conventional soft handoff algorithm in a dynamically changing RF environment, thereby significantly reducing the call drop rate associated with soft handoff in such an environment. The invention can also be used to provide improved selection parameters for a wide variety of other soft handoff algorithms. In addition, the invention can be used to implement improved soft handoff algorithms for use in wireless CDMA systems and other types of wireless systems.

DETAILED DESCRIPTION OF THE INVENTION

The present invention will be illustrated below in conjunction with an exemplary IS-95 code division multiple access (CDMA) wireless communication system. It should be understood, however, that the invention is not limited to use with any particular type of communication system, but is instead more generally applicable to any wireless system in which it is desirable to provide improved performance for soft handoffs. For example, although the techniques are illustrated with reference to IS-95 CDMA cellular and personal communications service (PCS) systems, it will be apparent to those skilled in the art that the techniques are also applicable to other CDMA systems, as well as to other types of wideband and narrowband wireless systems.

The term "primary base station" as used herein refers generally to a base station communicating directly with a given mobile station, such as the base station handling an on-going call for the mobile station. The term "soft handoff" refers generally to a handoff of an on-going call or other communication from one cell or sector of a wireless cellular system to another cell or sector of that system, without a change in communication frequency, and is also intended to include handoff techniques which are known in the art as "softer" handoffs or "semi-soft" handoffs.

Figure 1:
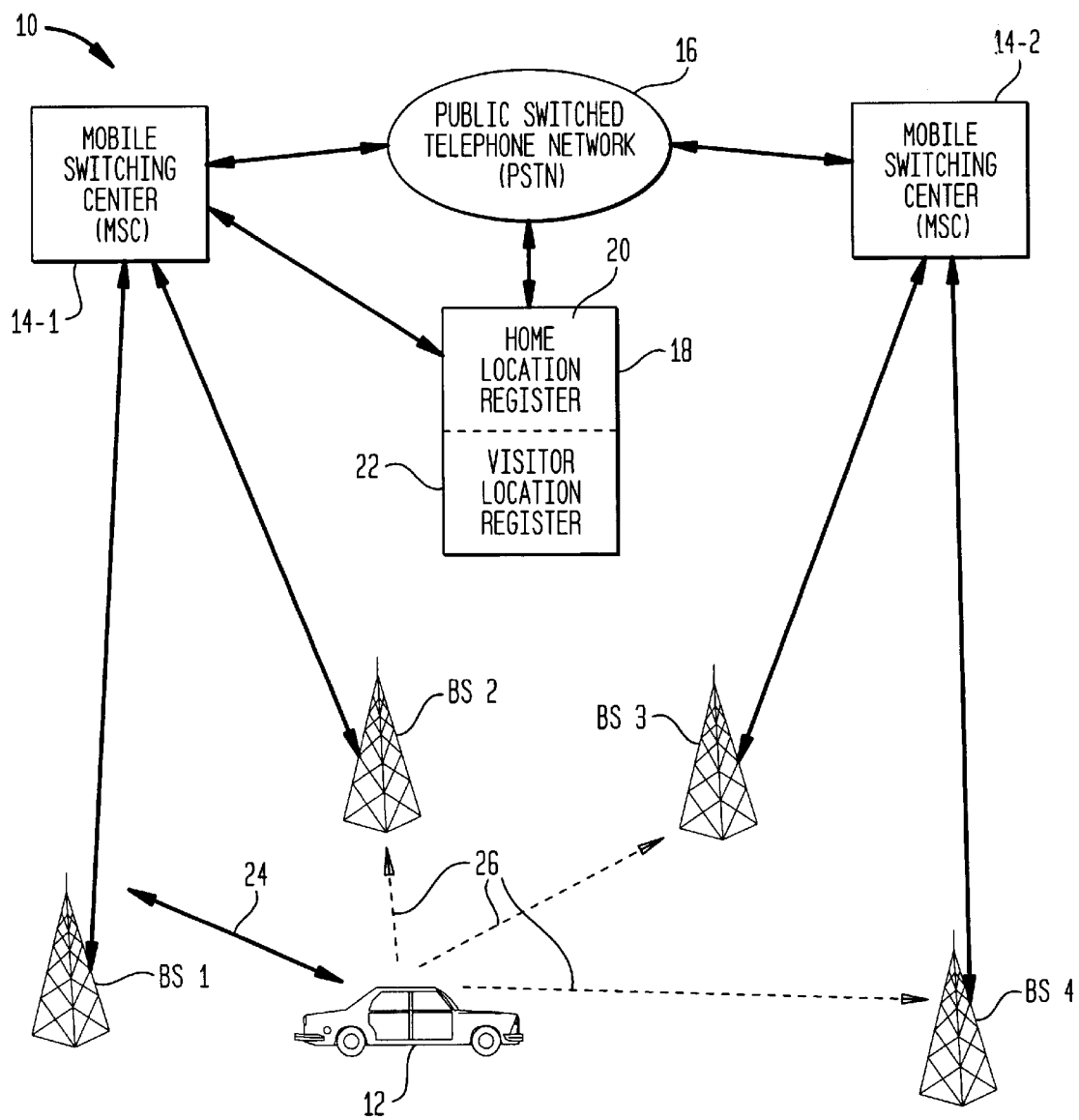
FIG. 1 shows an exemplary code division multiple access (CDMA) wireless communication system in which soft handoffs in accordance with the invention may be implemented.

FIG. 1 shows an exemplary cellular or personal communication services (PCS) system 10. The system 10 may be configured in accordance with one or more of the following standards documents: TIA/EIA/IS-95A and TIA/EIA/IS-95B, "Mobile Station—Base Station Compatibility Standard for Dual-Mode Wideband Spread Spectrum Cellular System," TIA/EIA/IS-97A, "Recommended Minimum Performance Standards for Base Station Supporting Dual-Mode Wideband Spread Spectrum Cellular Mobile Stations," and TIA/EIA/IS-98A, "Recommended Minimum Performance Standards for Dual-Mode Wideband Spread Spectrum Cellular Mobile Stations," and ANSI J-STD-008, "Personal Station—Base Station Compatibility Requirements for 1.8 to 2.0 GHz Code Division Multiple Access (CDMA) Personal Communication Systems."

The system 10 as illustrated includes a mobile station (MS) 12 and a number of base stations BS1, BS2, BS3 and BS4. The base station BS1 of FIG. 1 represents a primary base station, communicating with mobile station 12 via the path designated by solid two-way arrow 24, while the surrounding base stations BS2, BS3 and BS4 may serve as secondary base stations which can detect signals transmitted via the paths indicated by dashed one-way arrows 26. The primary base station BS1 communicates with the mobile station 12 using CDMA techniques described in the above-cited standards documents. As the mobile station 12 moves within the system 10, handoffs occur, such that base stations other than BS1 become primary base stations for communicating with the mobile station 12. Also, handoffs may occur from a given antenna sector of the primary base station and another sector of that base station.

The system 10 in this illustrative embodiment also includes first and second mobile switching centers (MSCs) 14-1 and 14-2. A given MSC typically connects several BSs with a public switched telephone network (PSTN) 16. For example, MSC 14-1 connects base stations BS1 and BS2 with the PSTN 16 and MSC 14-2 connects base stations BS3 and BS4 with the PSTN 16. The system 10 also includes a memory 18 having a number of registers including a home location register (HLR) 20 and a visitor location register (VLR) 22. The HLR 20 and VLR 22 store user data and billing information for each mobile station 12 of the system 10.

Figure 2:
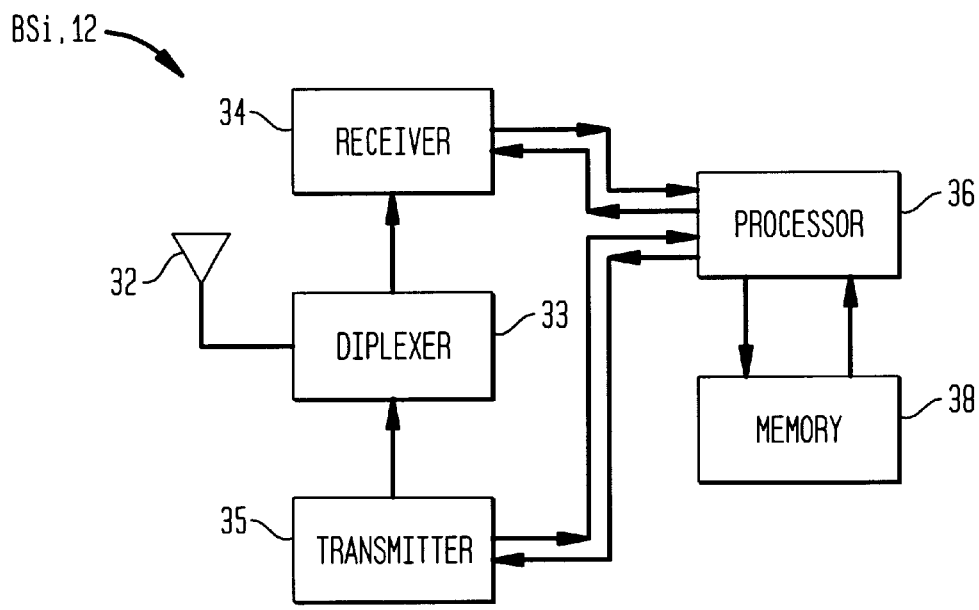
FIG. 2 is a block diagram showing an apparatus which can be utilized in performing soft handoffs in accordance with the invention.

FIG. 2 shows a more detailed view of an apparatus which may represent the mobile station 12 or a given one of the base stations BSi, i=1, 2, 3, 4, of the system 10. The apparatus includes an antenna 32 which receives signals from and transmits signals to other elements of the system 10. A receive signal is directed by a diplexer filter 33 to an input of a receiver 34 which may implement conventional downconversion, demodulation, digital-to-analog conversion and other processing of the receive signal. A transmitter 35 performs complementary operations such as analog-to-digital conversion, modulation and upconversion to generate a transmit signal which is directed via diplexer 33 to the antenna 32 for transmission.

A processor 36 is coupled to both the receiver 34 and the transmitter 35. The processor 36 operates in conjunction with a memory 38 to control the communication functions of the base station BSi or mobile station 12. For example, data or other information in messages which are part of a receive signal may be supplied to processor 36 such that processor 36 can implement the process steps to be described in conjunction with FIG. 3 below. The processor 36 may also perform receive signal power and signal-to-noise measurements, and generate messages which are incorporated into the transmit signal for transmission to one or more other elements of the system 10.

The invention provides soft handoff techniques which can provide improved performance relative to conventional techniques, e.g., in terms of a reduced call drop rate in a dynamically changing RF environment. The invention can be used to enhance the performance of an existing soft handoff process, e.g., an otherwise conventional IS-95 CDMA soft handoff process, or to generate new soft handoff algorithms for use in an IS-95 CDMA system or another type of wireless cellular system.

In accordance with a first aspect of the invention, referred to herein as Part I, the determination of a set of IS-95 CDMA soft handoff parameters is modified in accordance with a set of parameter selection rules. The IS-95 CDMA soft handoff parameters used in this example are the following:

1. Pilot Detection Threshold (T_ADD). This value is used by a mobile station, e.g., to trigger the transfer of a pilot from a neighbor set or a remaining set to a candidate set, or from the candidate set to the active set, and to trigger the sending of the Pilot Strength Measurement Message (PSMM) initiating the soft handoff process. This value is also referred to herein as an "add threshold"

2. Pilot Drop Threshold (T_DROP). This value is used by a mobile station to start a handoff drop timer for pilots in the active set and the candidate set. This value is also referred to herein as a "drop threshold"

3. Active Set Versus Candidate Set Comparison Threshold (T_COMP). A mobile station transmits a PSMM when the strength of a pilot in the candidate set exceeds that of a pilot in the active set by this margin. This value is also referred to herein as a "comparison threshold"

4. Drop Timer Value (T_TDROP). Timer value after which an action is taken by a mobile station for a pilot that is a member of the active set or candidate set, and whose strength has not become greater than T_DROP. If the pilot is a member of the active set, a PSMM is issued. If the pilot is a member of the candidate set, it will be moved to the neighbor set.

The term "active set" in the IS-95 context refers to a set of pilots associated with the forward traffic channels, i.e., base-to-mobile communication channels, assigned to a given mobile station. The term "candidate set" in the IS-95 context refers to the set of pilots that are not currently in the active set but have been received by the mobile station with sufficient strength to indicate that the associated forward traffic channels could be successfully demodulated. The term "neighbor set" in the IS-95 context refers to the pilots that are not currently in the active set or the candidate set and are likely candidates for handoff. The term "remaining set" in the IS-95 context refers to the set of all possible pilots in the current system on the current CDMA frequency assignment, excluding the pilots in the active set, the candidate set and the neighbor set. However, it should again be noted that the invention is not limited to use with IS-95 systems, and therefore does not require these particular definitions of active set, candidate set, neighbor set and remaining set.

In a typical IS-95 soft handoff process, a given mobile station commences communications with a new base station without interrupting communications with the current primary base station. Soft handoffs in an IS-95 system are generally used between CDMA channels having identical frequency assignments. As previously noted, soft handoff is designed to provide diversity of forward, i.e., base-to-mobile, traffic channels and reverse, i.e., mobile-to-base, traffic channel paths at the boundaries between base stations. As part of the soft handoff process, the mobile station searches for pilots on the current CDMA frequency assignment to detect the presence of CDMA channels and to measure their strengths. When the mobile station detects a pilot of sufficient strength that is not associated with any of the forward traffic channels assigned to it, it sends the above-noted PSMM to the primary base station. The primary base station can then assign a forward traffic channel associated with that pilot to the mobile station and direct the mobile station to perform a soft handoff to the corresponding base station.

Figure 3:
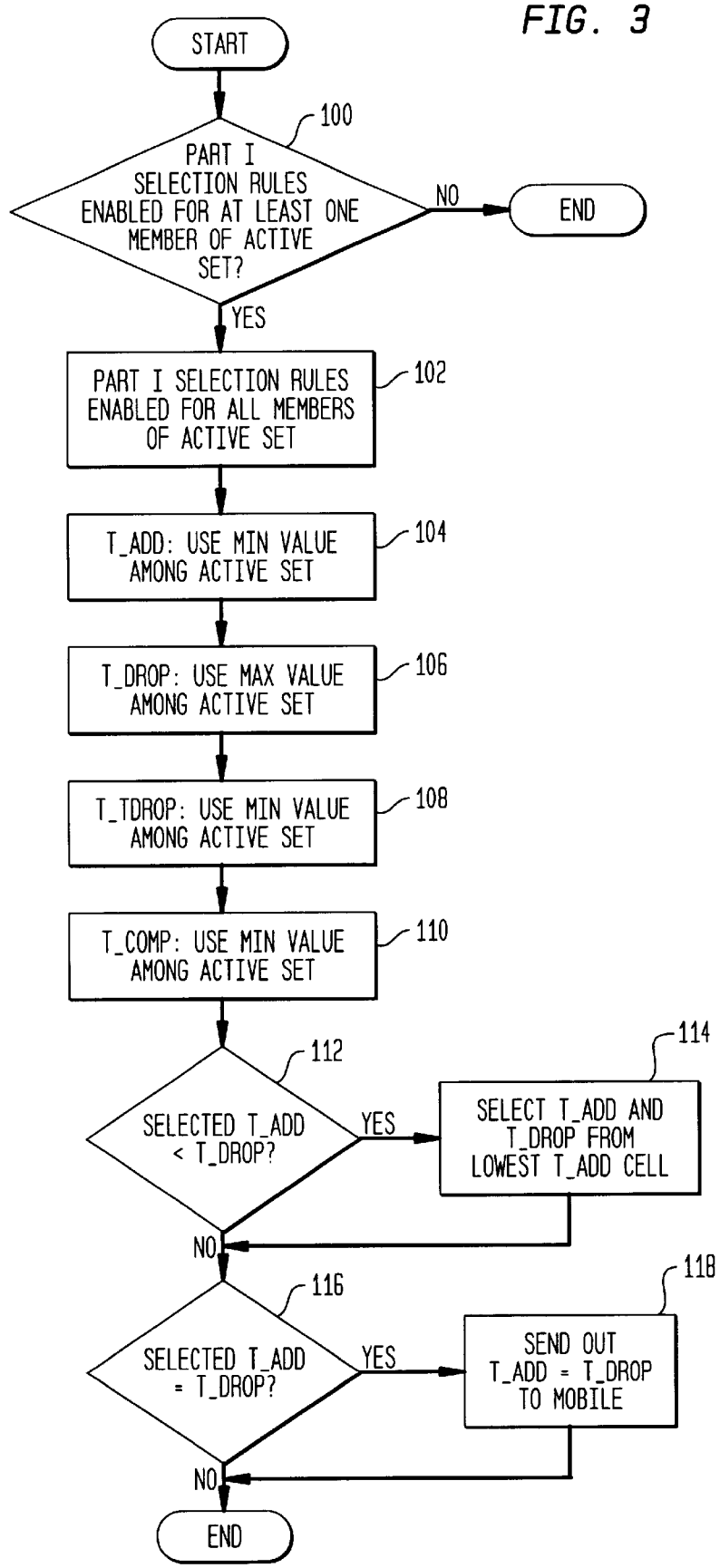
FIG. 3 is a flow diagram illustrating a soft handoff parameter selection process in accordance with the invention.

FIG. 3 is a flow diagram illustrating the operation of an exemplary set of Part I parameter selection rules in accordance with the invention. Each of these rules will be described in detail below. In this example, it is assumed that the scope of the soft handoff parameter selection process is on a per-ECPC (Executive Control Processor Complex), per-sector basis, and that all soft handoff parameter values are set up on a per-sector, per-carrier basis. The ECPC refers generally to a grouping of related base stations, i.e., a particular complex of base stations subject to common control functions, and for purposes of the present invention is intended to include any grouping of base stations which implement a common soft handoff process such as that described herein. It should be understood that these assumptions are not requirements of the invention, and other selection scopes and parameter value set ups may be used in other embodiments.

Step 100 of FIG. 3 determines if the above-described Part I selection rules are enabled for at least one member of the active set. If the Part I selection rules are enabled for at least one member of the active set, the Part I selection rules are enabled for all members of the active set, as indicated in step 102. If the Part I selection rules are not enabled for any member of the active set, it is assumed that well-known conventional soft handoff parameter selection will be applied in place of the Part I selection rules.

It should be noted that the term "active set" may also be used herein to refer to the cells, base stations or sectors associated with the corresponding pilots. A member of an active set may therefore be viewed as a pilot, or as the cell, base station or sector associated with that pilot. Moreover, as previously noted, the invention may be used with an active set other than that defined in the IS-95 standards documents.

1. T_ADD. Step 104 of FIG. 3 indicates that the minimum T_ADD value among the T_ADD values of the members of the active set is used. For example, if a given mobile station is in a soft handoff mode with an active set including two cells, cell A with T_ADD=−12 dB and cell B with T_ADD=−13 dB, the primary base station will inform the mobile station to use T_ADD=−13 dB. This allows the mobile station to more easily add a pilot to its candidate set so that the call will be more secure, i.e., less likely to be dropped.

2. T_DROP. Step 106 of FIG. 3 indicates that the maximum value among the T_DROP values of the members of the active set is used. For example, if a given mobile station is in a soft handoff mode with an active set including two cells, cell A with T_DROP=−15 dB and cell B with T_DROP=−16 dB, the primary base station will inform the mobile station to use T_DROP=−15 dB. This allows the mobile station to keep stronger pilots in its candidate set, and to drop weak pilots quickly.

3. T_TDROP. Step 108 of FIG. 3 indicates that the minimum value among the T_TDROP values of the members of the active set is used. The use of the minimum value timer allows the mobile station to respond more quickly to changes in RF conditions and allows for the maintenance of all sets in a more timely manner.

4. T_COMP. Step 110 of FIG. 3 indicates that the minimum value among the T_COMP values of the members of the active set is used. Because the T_ADD is now the minimum, which helps the mobile station to more easily add a pilot, this lowest comparison value allows the mobile station to respond more quickly to changes in RF conditions and allows for the maintenance of all sets in a more timely manner.

5. If the selected T_ADD is below the selected T_DROP, as determined in step 112, the T_ADD and T_DROP parameters from the lowest T_ADD cell are selected in step 114. For example, if cell A has (T_ADD, T_DROP)=(−12 dB, −14 dB) and cell B has (T_ADD, T_DROP)=(−15 dB, −17 dB), then the (T_ADD, T_DROP) parameters sent by the primary base station to the mobile station should be (−15 dB, −17 dB).

6. If the selected T_ADD is equal to the selected T_DROP, as determined in step 116, the parameters T_ADD=T_DROP are sent in step 118 by the primary base station to the mobile station. For example, if cell A has (T_ADD, T_DROP)=(−13 dB, −15 dB) and cell B has (T_ADD, $T_{13}$ DROP)=(−15 dB, −17 dB), then the (T_ADD, T_DROP) sent to the mobile station should be (−15 dB, −15 dB).

Another aspect of the invention, referred to herein as Part II, is a soft handoff algorithm to be described in greater detail below in conjunction with the flow diagram of FIG. 4. The algorithm in the illustrative embodiment uses a different set of T_ADD and T_DROP parameters for IS-95B soft handoff. These parameters are referred to as T_ADD_B and T_DROP_B, respectively. The parameters T_ADD and T_DROP remain as defined in the above-cited IS-95A document. In step 200 of FIG. 4, the following parameters are computed or otherwise determined for cells A and B in the active set:

T_ADD(a)=T_ADD_B of cell A; T_ADD(b)=T_ADD_B of cell B;

T_ADD(ab)=min(T_ADD(a), T_ADD(b)) as defined in Part I;

T_DROP(a)=T_DROP_B of cell A; T_DROP(b)=T_DROP_B of cell B;

T_DROP(ab)=max(T_DROP(a), T_DROP(b)) as defined m Part I;

SOFT_SLOPE(a)=SOFT_SLOPE of cell A;
ADD_INTERCEPT(a)=ADD_INTERCEPT of cell A;
SOFT_SLOPE(b)=SOFT_SLOPE of cell B;
ADD_INTERCEPT(b)=ADD_INTERCEPT of cell B;
Quality(a)=(T_ADD(ab)-ADD_INTERCEPT(a))/SOFT_SLOPE(a);
Quality(b)=(T_ADD(ab)-ADD_INTERCEPT(b))/SOFT_SLOPE(b); and
Quality(ab)=max(Quality(a), Quality(b)).

Step 202 determines if Quality(a)=Quality(b), based on the results of the computations in step 200. If Quality(a) ≠Quality(b), step 204 indicates that the parameters SOFT_SLOPE, ADD_INTERCEPT and DROP_INTERCEPT are selected from the cell associated with Quality(ab).

As defined in the above-cited IS-95 document, the SOFT-SLOPE parameter refers to a slope-related value used in a specified inequality criterion for adding a pilot to the active set, or in a specified inequality criterion for dropping a pilot from the active set. The ADD_INTERCEPT parameter refers to an intercept-related value in the above-noted inequality criterion for adding a pilot to the active set, and the DROP_INTERCEPT refers to an intercept-related value in the above-noted inequality criterion for dropping a pilot from the active set. Each of these parameters is typically set by the primary base station as an unsigned binary number. The ADD_INTERCEPT and DROP_INTERCEPT parameters are generally in units of dB.

An example of an inequality criterion for adding a pilot to the active set is given in the above-cited IS-95 document as:

$$10 \log_{10} PS > \frac{\text{SOFT\_SLOPE}}{8} 10 \log_{10} \sum_{i \in A} PS_i + \frac{\text{ADD\_INTERCEPT}}{2},$$

where PS refers to the power level of the pilot being considered for addition to the active set, and $PS_i, i \in A$, refers to the power level of a given current member of the active set. If the above inequality is satisfied, the above-noted PSMM is sent to the primary base station as part of the soft handoff process.

An example of an inequality criterion for dropping a pilot from the active set is given in the above-cited IS-95 document as:

$$10 \log_{10} PS_i <$$

$$\max \left( \frac{\text{SOFT\_SLOPE}}{8} 10 \log_{10} \sum_{j > i} PS_j + \frac{\text{DROP\_INTERCEPT}}{2}, \frac{\text{T\_DROP}}{2} \right),$$

where $PS_i$ refers to the power level of the ith member of the active set, and the members of the active set are assumed to be arranged in order of increasing power levels. If the above inequality is satisfied, a drop timer is started for the corresponding member of the active set, and that member is subsequently dropped from the active set if the inequality remains satisfied at the expiration of the drop timer.

Referring again to FIG. 4, If Quality(a)=Quality(b) in step 202, the SOFT_SLOPE, ADD_INTERCEPT and DROP_INTERCEPT parameters are selected from the cell associated with T_ADD(ab), as shown in step 206. Step 208 indicates that, for calls which are in a soft handoff mode, if the above-described Part I rules are enabled, the primary base station must select the set of soft handoff parameters according to the selection algorithm, and send the selected values of these parameters to the mobile station.

The following additional processing steps are applied in the exemplary soft handoff algorithm:

1. During the soft handoff process, the selection algorithm for determining soft handoff parameters shall be enabled if any member of the active set, including a new member being added, but not including a member being dropped, has the Part I rules enabled and if every member of the active set supports the Part I selection rules.

2. During the soft handoff process, if any member of the active set does not support the Part I rules, the entire parameter selection function, i.e., both Part I and Part II as described above, will be disabled. In this case, the primary base station will use its own parameter values.

3. When the Part I parameter selection is enabled based on the above two items, the primary base station will select the parameters SOFT_SLOPE, ADD_INTERCEPT and DROP_INTERCEPT from among only those members of the active set that support the above-noted IS-95B soft handoff algorithm, and will ignore the members that do not. The primary base station will then select other soft handoff parameters (e.g., T_COMP, etc.) in accordance with the parameter selection rules of Part I.

4. If only one member of the active set supports the above-noted IS-95B soft handoff algorithm, the primary base station will do the following:

(a) If the primary base station supports the IS-95B algorithm, it will use its own values for the Part II soft handoff parameters, and select the other soft handoff parameters from the other members in the active set as per the Part I parameter selection rules.

(b) If the primary base station does not support the IS-95B algorithm, it will ignore the Part II selection of the IS-95B soft handoff parameters, and select the other soft handoff parameters as per the Part I parameter selection rules.

5. If none of the members of the active set support the IS-95B handoff algorithm, the parameter selection will be in accordance with the Part I parameter selection rules only.

The remainder of the soft handoff process may be implemented in a well-known conventional manner, e.g., in the manner described in the above-cited IS-95 standards, and therefore will not be described in detail herein. For example, as previously described, the selected parameters may be used to control the addition and deletion of pilots from the active and candidate sets, and the transmission of the above-noted PSMMs from the corresponding mobile station to the current primary base station. The current primary base station can then, e.g., direct the mobile station to handoff ongoing forward channel communication to another base station of the system.

Figure 5:
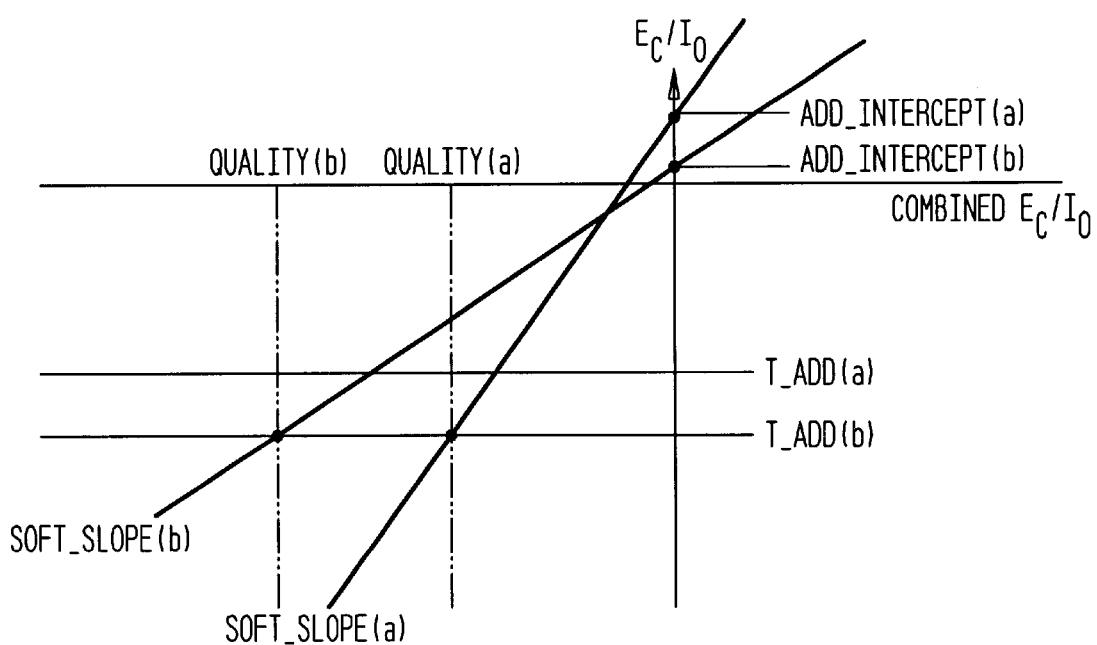
FIG. 5 is a diagrammatic illustration of a portion of a parameter selection process in accordance with the invention.

FIG. 5 shows an example illustrating the operation of the above-described soft handoff parameter selection process. In this example, the parameters of cell A and cell B are as follows:

Cell A:
T_ADD(a)=−12 dB
SOFT_SLOPE(a)=1.60
ADD_INTERCEPT(a)=3 dB
T-DROP=−14 dB
Cell B:
T_ADD(b)=−13 dB
SOFT_SLOPE(b)=1.25
ADD_INTERCEPT(b)=2 dB
T_DROP=−15 dB.

These parameters are plotted in terms of Ec/Io as a function of combined Ec/Io in the diagram of FIG. 5. Ec/Io refers to the ratio in dB of the pilot signal energy accumulated over one pseudorandom noise (PN) chip period (Ec) to the total power spectral density in the received bandwidth (Io). The operation of the previously-described selection process given the above example parameters is then as follows. The computations listed in step 200 of FIG. 4 yield the following:

T_ADD(ab)=min(T_ADD(a), T_ADD(b))=T_ADD(b)=−13 dB

T_DROP(ab)=max(T_DROP(a), T_DROP(b))=T_DROP(a)=−14 dB

Quality(a)=(T_ADD(ab)−ADD_INTERCEPT(a))/SOFT_SLOPE(a)=−10 dB

Quality(b)=(T_ADD(ab)−ADD_INTERCEPT(b))/SOFT_SLOPE(b)=−12 dB

Figure 4:
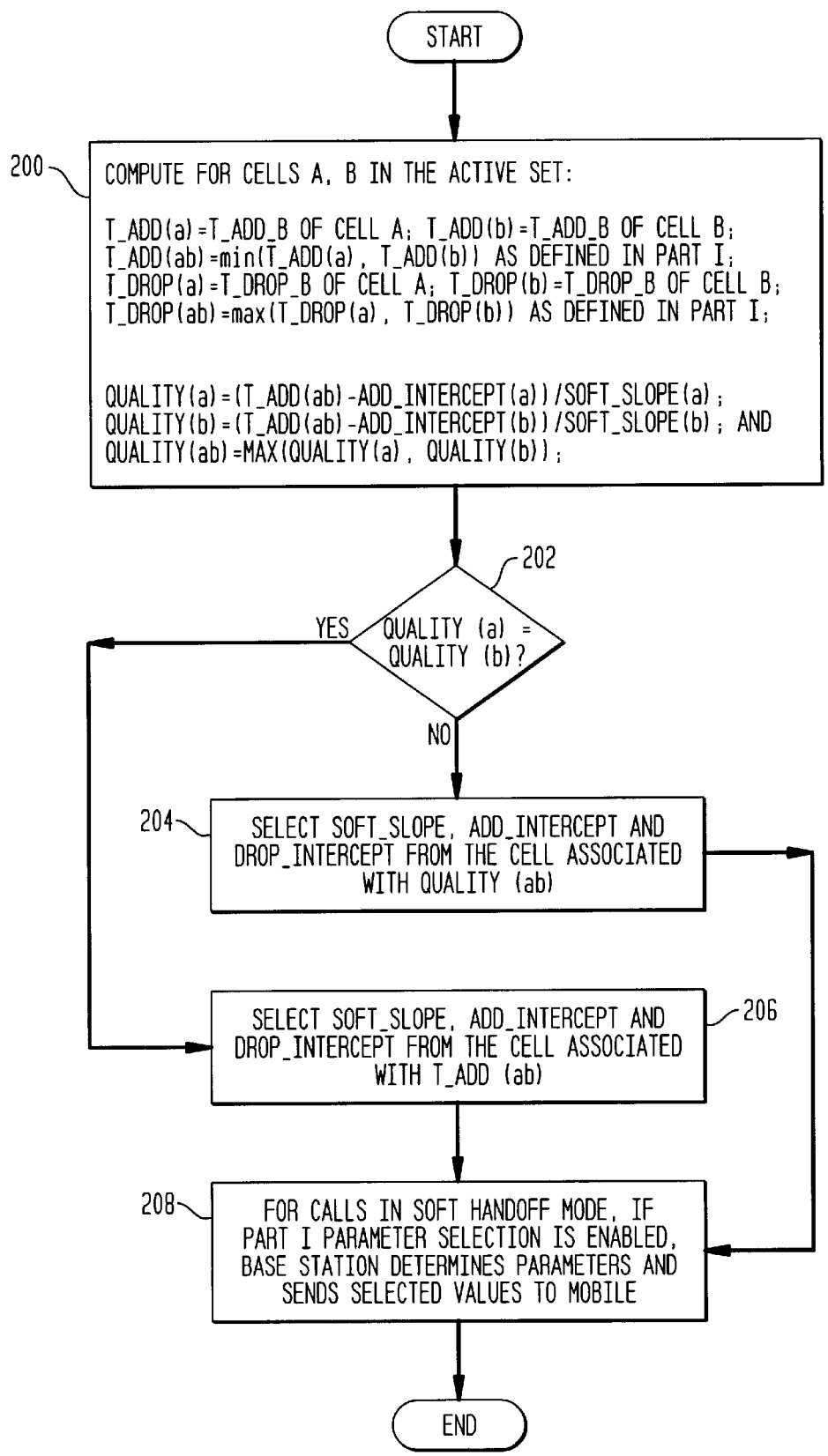
FIG. 4 is a flow diagram illustrating a portion of a soft handoff algorithm in accordance with the invention.

Quality(ab)=max(Quality(a), Quality(b))=Quality(a)=−10 dB;

Since Quality(a)≠Quality(b), and cell A has the maximum value quality measure of cell A and cell B, step 206 of FIG. 4 indicates that the parameters SOFT_SLOPE, ADD_INTERCEPT and DROP_INTERCEPT are selected from cell A in this example. The soft handoff process then continues in the manner previously described.

Note that in the above-described computation of the parameters Quality(a) and Quality(b), the combined parameter T_ADD(ab) is used. This ensures that the Part I parameter selection process does not impact the Part II soft handoff algorithm, and also ensures that the Quality parameters from different base stations can be properly compared.

Although the illustrations above refer to an active set including members A and B, it should be understood that the invention is more generally applicable to an active set with any number of members. Moreover, the parameter selection and handoff algorithm aspects of the invention can be applied to all of the members of a given active set, or to a suitable subset of those members. In a case in which the active set includes N members, A1 through AN, the above-described equations for determining quality measures may be rewritten as follows:

Quality(A1)=(T_ADD(A1A2 . . . AN)−ADD_INTERCEPT(A1))/SOFT_SLOPE(A1);

Quality(A2)=(T_ADD(A1A2 . . . AN)−ADD_INTERCEPT(A2))/SOFT_SLOPE(A2);

Quality(AN)=(T_ADD(A1A2 . . . AN)−ADD_INTERCEPT(AN))/SOFT_SLOPE(AN);

Quality(A1A2 . . . AN)=max(Quality(A1), Quality(A2), . . . Quality(AN)).

Parameters such as T_ADD(A1A2 . . . AN) and other required parameters are selected or otherwise determined in a manner similar to that previously described for the active set with two members corresponding to cell A and cell B. The value of N is typically less than or equal to six, although other values of N could be used in other embodiments.

The soft handoff parameter selection and algorithm of FIGS. 3 and 4, respectively, can be implemented in whole or in part in the form of one or more software programs executed using appropriate system processing hardware, such as processor 36 and memory 38 in the apparatus of FIG. 2. The invention may be implemented in whole or in part in one or more base stations, one or more mobile stations, or in combinations of base stations and mobile stations.

The foregoing description of the invention is intended to be illustrative only. For example, the particular configuration of the system 10, the base station BSi, and the mobile station 12 are for purposes of illustration only, and should not be construed as limiting the invention to any particular embodiment or group of embodiments. Moreover, the particular sets of selection rules shown in FIG. 3 and the soft handoff algorithm shown in FIG. 4 are by way of example, and alternative embodiments of the invention may use other arrangements of rules or processing steps. These and numerous other alternative embodiments within the scope of the following claims will be readily apparent to those skilled in the art.

What is claimed is:

1. A method of determining parameters for use in a soft handoff process in a wireless communication system in which a mobile station communicates with one or more base stations, the method comprising the steps of:

selecting a value of at least a first soft handoff parameter, from among a set of parameter values each corresponding to a particular member of an active set of pilots, in accordance with a set of selection rules;

determining a quality measure for each of at least a subset of the members of the active set, wherein the quality measure is determined for a given one of the members of the active set at least in part using the selected soft handoff parameter value and a value of at least one additional parameter associated with the given member; and selecting a particular value of the at least one additional parameter based at least in part on the determined quality measures, such that the selected values of the first and additional handoff parameters are utilized in the soft handoff process.

2. The method of claim 1 wherein the wireless communication system is an IS-95 CDMA system.

3. The method of claim 1 wherein the at least one additional parameter comprises at least one of an add intercept, a drop intercept and a slope.

4. The method of claim 1 wherein a given one of the selection rules indicates that a minimum add threshold value among a set of add threshold values associated with members of the active set is selected for use in the soft handoff process.

5. The method of claim 1 wherein a given one of the selection rules indicates that a maximum drop threshold value among a set of drop threshold values associated with members of the active set is selected for use in the soft handoff process.

6. The method of claim 1 wherein a given one of the selection rules indicates that a minimum drop threshold timer value among a set of drop threshold timer values associated with members of the active set is selected for use in the soft handoff process.

7. The method of claim 1 wherein a given one of the selection rules indicates that a minimum comparison threshold value among a set of comparison threshold values associated with members of the active set is selected for use in the soft handoff process.

8. The method of claim 1 wherein a given one of the selection rules indicates that, if the selected add threshold value is below the selected drop threshold value, the add and drop threshold values associated with the member of the active set having the lowest add threshold value are selected for use in the soft handoff process.

9. The method of claim 1 wherein a given one of the selection rules indicates that, if the selected add threshold value is equal to the selected drop threshold value, the equal add and drop threshold values are selected for use in the soft handoff process.

10. The method of claim 1 wherein the determining step further includes determining the quality measure for the given one of the members of the active set using the minimum add threshold value among the values associated with the members of the active set, and add intercept and slope parameter values associated with the given member of the active set.

11. The method of claim 10 wherein the selecting step further includes selecting the additional parameter values as the additional parameter values associated with the member having the maximum quality measure among the members of the active set.

12. An apparatus for determining parameters for use in a soft handoff process in a wireless communication system in which a mobile station communicates with one or more base stations, the apparatus comprising:

a processor operative: (i) to select a value of at least a first soft handoff parameter, from among a set of parameter values each corresponding to a particular member of an active set of pilots, in accordance with a set of selection rules; (ii) to determine a quality measure for each of at least a subset of the members of the active set, wherein the quality measure is determined for a given one of the members of the active set at least in part using the selected soft handoff parameter value and a value of at least one additional parameter associated with the given member; and (iii) to select a particular value of the at least one additional parameter based at least in part on the determined quality measures; and a memory coupled to the processor for storing the selected values of the first and additional handoff parameters, such that the stored values may be utilized in the soft handoff process.

13. The apparatus of claim 12 wherein the wireless communication system is an IS-95 CDMA system.

14. The apparatus of claim 12 wherein the at least one additional parameter comprises at least one of an add intercept, a drop intercept and a slope.

15. The apparatus of claim 12 wherein a given one of the selection rules indicates that a minimum add threshold value among a set of add threshold values associated with members of the active set is selected for use in the soft handoff process.

16. The apparatus of claim 12 wherein a given one of the selection rules indicates that a maximum drop threshold value among a set of drop threshold values associated with members of the active set is selected for use in the soft handoff process.

17. The apparatus of claim 12 wherein a given one of the selection rules indicates that a minimum drop threshold timer value among a set of drop threshold timer values associated with members of the active set is selected for use in the soft handoff process.

18. The apparatus of claim 12 wherein a given one of the selection rules indicates that a minimum comparison threshold value among a set of comparison threshold values associated with members of the active set is selected for use in the soft handoff process.

19. The apparatus of claim 12 wherein a given one of the selection rules indicates that, if the selected add threshold value is below the selected drop threshold value, the add and drop threshold values associated with the member of the active set having the lowest add threshold value are selected for use in the soft handoff process.

20. The apparatus of claim 12 wherein a given one of the selection rules indicates that, if the selected add threshold value is equal to the selected drop threshold value, the equal add and drop threshold values are selected for use in the soft handoff process.

21. The apparatus of claim 12 wherein the processor is further operative to determine the quality measure for the given one of the members of the active set using the minimum add threshold value among the values associated with the members of the active set, and add intercept and slope parameter values associated with the given member of the active set.

22. The apparatus of claim 21 wherein the processor is further operative to select the additional parameter values as the additional parameter values associated with the member having the maximum quality measure among the members of the active set.

* * * * *